(12) United States Patent
    Al-Banna

(10) Patent No.: US 11,159,971 B2
(45) Date of Patent: Oct. 26, 2021

(54) INTERFERENCE GROUP CREATION IN FULL DUPLEX NETWORKS

(71) Applicant: ARRIS Enterprises LLC, Suwanee, GA (US)

(72) Inventor: Ayham Al-Banna, Orland Park, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 16/515,505

(22) Filed: Jul. 18, 2019

(65) Prior Publication Data

US 2020/0037189 A1    Jan. 30, 2020

Related U.S. Application Data

(60) Provisional application No. 62/702,671, filed on Jul. 24, 2018.

(51) Int. Cl.
    *H04W 24/10*      (2009.01)
    *H04B 17/336*     (2015.01)
    *H04W 72/04*      (2009.01)
    *H04W 72/08*      (2009.01)

(52) U.S. Cl.
    CPC ......... *H04W 24/10* (2013.01); *H04B 17/336* (2015.01); *H04W 72/0453* (2013.01); *H04W 72/082* (2013.01)

(58) Field of Classification Search
    CPC ..... H04W 24/08; H04W 24/10; H04W 72/04; H04W 72/0453; H04W 72/08; H04W 72/082; H04J 11/0023; H04B 17/336; H04B 17/345; H04L 5/006; H04L 5/0073
    See application file for complete search history.

(56) References Cited

U.S. PATENT DOCUMENTS

| | | | | |
|---|---|---|---|---|
| 7,692,532 B2* | 4/2010 | Fischer | ............. | G06K 7/10356 340/10.2 |
| 7,933,350 B2* | 4/2011 | Liu | ............. | H04L 5/0075 375/260 |
| 8,364,188 B2* | 1/2013 | Srinivasan | ........... | H04J 11/0023 455/510 |
| 9,112,670 B2* | 8/2015 | Song | ............. | H04L 5/0069 |
| 9,647,801 B2* | 5/2017 | Al-banna | ............. | H04L 5/0037 |
| 10,033,542 B2* | 7/2018 | Jin | ............. | H04L 49/70 |
| 10,230,519 B2* | 3/2019 | Chapman | ............. | H04L 47/781 |
| 10,548,142 B2* | 1/2020 | Mueck | ............. | H04W 16/14 |

(Continued)

OTHER PUBLICATIONS

PCT International Search Report & Written Opinion, RE: Application No. PCT/US2019/042400, dated Oct. 14, 2019.

(Continued)

*Primary Examiner* — Tri H Phan
(74) *Attorney, Agent, or Firm* — Chernoff, Vilhauer, McClung & Stenzel, LLP

(57) ABSTRACT

In some embodiments, a method sets a threshold over a frequency spectrum and receives a set of measurements that measures interference between a set of network devices over the frequency spectrum. A set of metric values based on the set of measurements is compared to the threshold at a plurality of points over the frequency spectrum. The method then selects whether the set of network devices are in a group that interfere with communications of each other based on the comparing.

19 Claims, 11 Drawing Sheets

(56) References Cited

U.S. PATENT DOCUMENTS

2011/0300891 A1* 12/2011 Deb .................. H04L 5/0037
  455/510
2019/0334746 A1   10/2019 Arambepola et al.

OTHER PUBLICATIONS

DVB Organization, "CM-SP-SM-OSSIv3.1-I12-180509.pdf", DVB, May 13, 2018.

* cited by examiner

INTERFERENCE GROUP CREATION IN FULL DUPLEX NETWORKS

CROSS-REFERENCES TO RELATED APPLICATIONS

The present disclosure claims priority to U.S. Provisional App. No. 62/702,671, entitled "FLEXIBLE AND OPTIMAL INTERFERENCE GROUP CREATION IN FDX SYSTEMS", filed Jul. 24, 2018, the contents of which is incorporated herein by reference in its entirety.

BACKGROUND

A full duplex network allows downstream (DS) and upstream (US) signals to be sent within a same frequency spectrum on the network. For example, full duplex Data Over Cable Service Interface Specification (DOCSIS) allows a multiple service operator (MSO) to offer symmetrical services within a frequency spectrum on a network, such as a hybrid fiber coaxial network, to modems. One characteristic of the network is that it is a single-point to multi-point network where multiple modems are connected to a single node through the same network portion, also referred to as the plant. The node transmits the downstream signals to the multiple modems and also receives the upstream signals from the modems connected to the plant.

Because of the single-point to multi-point network, there may be some inter-connectivity between the modems, such as each modem does not have a purely isolated point-to-point channel with the node. This inter-connectivity between the modems causes interference between the modems, which may be referred to as co-channel interference (CCI). That is, the upstream transmission of one modem may affect the quality of the downstream reception of a signal at another modem when those modems have strong inter-connectivity between them or limited isolation. The inter-modem co-channel interference may not be cancelled because the recipient modem does not know about the characteristics of the transmitted signal from the interferer modem and cannot mitigate the interference.

DETAILED DESCRIPTION

Described herein are techniques for an interference group creation system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments generate interference groups (IGs) for a network. An interference group is a collection of network devices, such as modems, that may have poor isolation between each other such that the upstream transmission of one modem may interfere with the downstream reception of a signal for another modem, or vice versa. A process may be used where modems to send beacon signals while other modems listen to the beacon signals and generate measurements, such as signal-to-noise ratios (SNR) or modulation error ratio (MER) measurements, before the beacon signal is transmitted and while the beacon signal is transmitting.

A system then uses the measurements to generate the interference groups. In some embodiments, a system sets a threshold over a frequency spectrum. For example, the threshold may be a fixed threshold that is fixed across the frequency spectrum or a variable threshold that varies in value across the frequency spectrum in which the modems transmit upstream and downstream signals. The system receives measurements that measure interference between a set of modems over the frequency spectrum. Then, the system compares a metric that is based on the measurements to the threshold at multiple points across the frequency spectrum. Based on the comparison, the system selects whether network devices are in a group that interferes with communications of each other.

Because the threshold is set across the frequency spectrum, the interference groups may be selected differently. For example, the system may select frequency groups based on comparisons over a sub-band, channel, sub-carriers, or other divisions of the frequency spectrum. This allows the creation of interference groups on a greater granularity across the frequency spectrum instead of creating an interference group for the entire frequency spectrum.

System Overview

Figure 1:
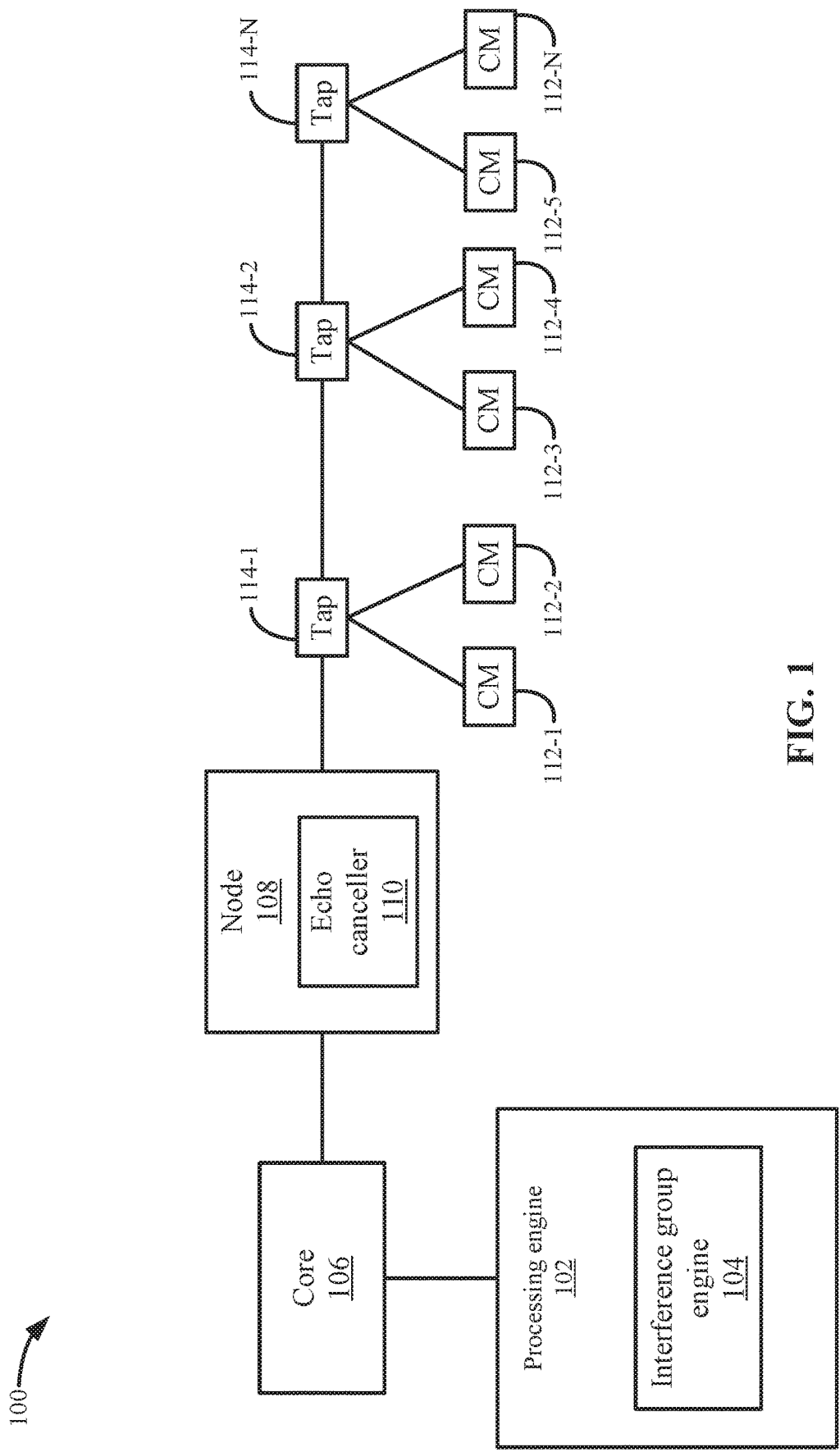
FIG. 1 depicts a simplified system for generating interference groups according to some embodiments.

FIG. 1 depicts a simplified system 100 for generating interference groups according to some embodiments. A network in system 100 includes a core 106, a node 108, taps 114-1 to 114-N, and network devices 112-1 to 112-N. Network devices 112 will be referred to as modems, such as cable modems (CM), but other types of network devices that can send and receive signals may be used, such as gateways, customer premise equipment (CPE), set top boxes, etc. Cable modems 112 are configured to receive data from core 106, and provide the data to a subscriber device, such as a set-top box, television, smart phone, etc. Cable modem 112 may be an interface with the network outside of a subscriber's premises.

In some embodiments, the network provides data over a cable system according to a protocol, such as the DOCSIS protocol. The network may be based on different physical topologies, such as a hybrid fiber coaxial network, but other networks may be used. In some embodiments, the network may be a remote physical network (R-PHY) in which physical layer-related circuitry is located in node 108, which is located closer to subscriber premises in the network than core 106. In some embodiments, a converged cable access platform (CCAP) core may be located in a headend and node 108 may include a remote physical device (RPD) that interfaces between cable modems 112 and core 106. Core 106 contains media access control (MAC) signaling functions.

Core 106 may send downstream signals through a digital network, such as a fiber network to node 108. Node 108 may convert the digital signals to analog signals and send those signals to cable modems 112-1 to 112-N.

Node 108 may be an optical node device that may be located at the junction of the fiber and coaxial plants. That is, node 108 may receive digital signals via optical fiber, convert those signals to analog, such as radio frequency, and send the analog signals via coaxial cable to cable modems 112. Node 108 receives the digital signals over the fiber and converts those digital signals to analog radio frequency signals for transmission over the coaxial cable. Also, node 108 converts upstream analog signals, such as radio frequency signals, received over the coaxial cable from cable modems 112 to digital for transmission over the fiber network to core 106.

As discussed above, a single-point to multi-point network may be used where modems connected to the same plant that are connected to node 108 transmit upstream signals and receive downstream signals in the same frequency spectrum. In some embodiments, node 108 includes an echo canceler 110 that may cancel the interference generated by node 108 where its transmitted downstream signal may leak and/or reflect from the plant and interfere with the upstream signals that node 108 is trying to receive. Since node 108 knows the characteristics of its transmitted signal, node 108 may be able to cancel the interference. Also, cable modems 112 cannot cancel the interference because a recipient cable modem 112 does not know the characteristics of the transmitted signal for the other modem that is causing the interference and cannot mitigate the signal. Although modems 112 may cancel their own interference signal if a modem wants to use same frequency for upstream and downstream, a modem 112 cannot remove/cancel interference caused by other modems 112 because this modem 112 does not know the characteristics of the transmitted signal from the other modems. In some embodiments, modems 112 are connected to taps 114 of the network plant and may have a greater chance to interfere with other modems 112 connected to the same tap 114, but modems connected to different taps may also interfere with each other.

Although a remote physical (RPHY) network is described, any multi-point-to-a single point system may experience the interference described and may be used in the generation of interference groups as described. The system may be one-to-multi point system where the devices (e.g., taps 114) that connect the sub devices (e.g., modems 112) have finite amount of isolation between the ports causing interference between the sub devices. Accordingly, a modem does not have to be a cable modem, such as if the physical medium is different than cable (e.g., twisted pair), then the device may be a twisted pair modem. The sub device depends on the medium.

To avoid the interference between cable modems 112, a processing engine 102 includes an interference group engine 104 that generates interference groups that include different sets of cable modems 112. In some embodiments, an interference group may include two or more cable modems 112. Cable modems 112 in an interference group may have limited isolation between them and thus may interfere with each other when one cable modem 112 transmits a signal while another cable modem receives a signal. A cable modem may be in just one interference group. The opposite may also be formed where modems 112 in an interference group do not interfere with each other.

As will be described in more detail below, interference group engine 104 may generate interference groups based on a threshold that is applied over a frequency spectrum. The following will describe the frequency spectrum and then how to generate the interference groups.

Frequency Spectrum

Figure 2:
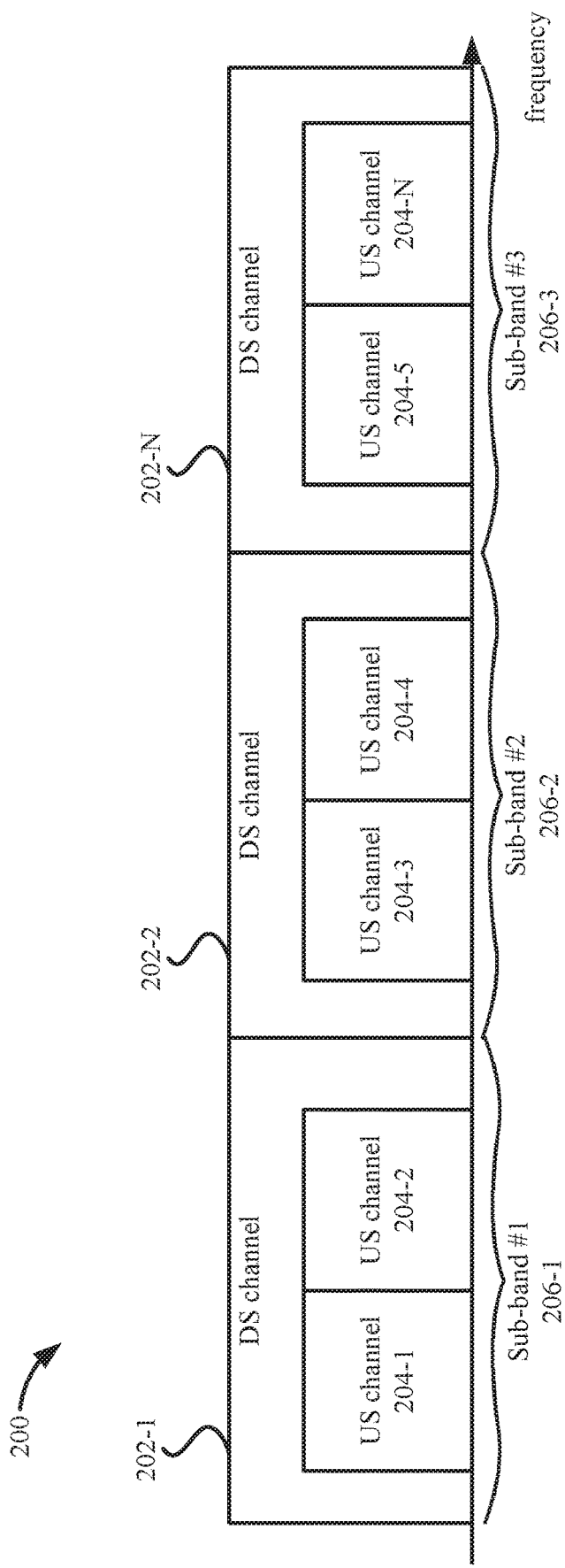
FIG. 2 depicts a frequency spectrum according to some embodiments.

FIG. 2 depicts a frequency spectrum 200 according to some embodiments. Frequency spectrum 200 may be a range of frequencies in which downstream signals are received at cable modems 112 and upstream signals are sent from cable modems 112. Frequency spectrum 200 may be broken into different granularities of frequency ranges, such as sub-bands, channels, and sub-carriers. A sub-band may be a fixed portion of spectrum. A channel may be a portion of electromagnetic spectrum within a sub-band that is used to convey one or more radio frequency signals. A sub-carrier may be one of a large number of closely-spaced or overlapping orthogonal narrow-band width data signals within a channel, such as an OFDM channel.

In some embodiments, frequency spectrum 200 is broken into sub-bands 206-1 to 206-3, which are a first division of the frequency spectrum (e.g., a range of frequencies). A different number of sub-bands may be used and the number is not limited to three sub-bands. A sub-band 206 may be broken into channels. For example, a channel may include a downstream (DS) channels 202-1, 202-2, . . . 202-N in which downstream signals are sent. Also, a channel may include upstream (US) channels 204-1 to 204-N in which upstream signals can be sent.

Each channel may be a second division of frequencies in frequency spectrum 200. For example, each channel may have a frequency spectrum that is equal to or less than the frequency spectrum of a sub-band. As shown, a sub-band includes one downstream channel 202 and two upstream channels 204; however, a sub-band may include different numbers of downstream channels 202 and upstream channels 204. But, at least one downstream channel and at least one upstream channel overlap in frequency in a sub-band 206. For example, downstream channel 202-1 is in a first frequency range in which downstream signals are sent from core 106 to cable modems 112. In some embodiments, downstream channel 202-1 uses the same frequency range as sub-band #1. Within downstream channel 202-1, upstream channels 204-1 and 204-2 are used by cable modems 112 to transmit upstream signals to core 106. In some embodiments, upstream channels 204 may occupy different subsets of the frequency spectrum in downstream channel 202-2. For example, upstream channel 204-1 is included in a first subset of frequencies in sub-band #1 and upstream channel 204-2 is included in a second subset of frequencies in sub-band #1. However, other configurations may be used. For example, an upstream channel may have the same or less than the frequency spectrum of a downstream channel. In other examples, any number of upstream channels 204 may be found in a downstream channel 202.

Frequency spectrum 200 may also be broken into other granularities, such as sub-carrier frequencies. For example, downstream channel 202 and upstream channel 204 may be broken into sub-carriers that are of a smaller range frequency. The sub-carriers are used to carry a signal in the upstream direction and the downstream direction. Accordingly, downstream channels 202 and upstream channels 204 may include multiple sub-carriers that are subsets of frequency spectrum 200 within the respective channel.

Interface Group Generation

Figure 3:
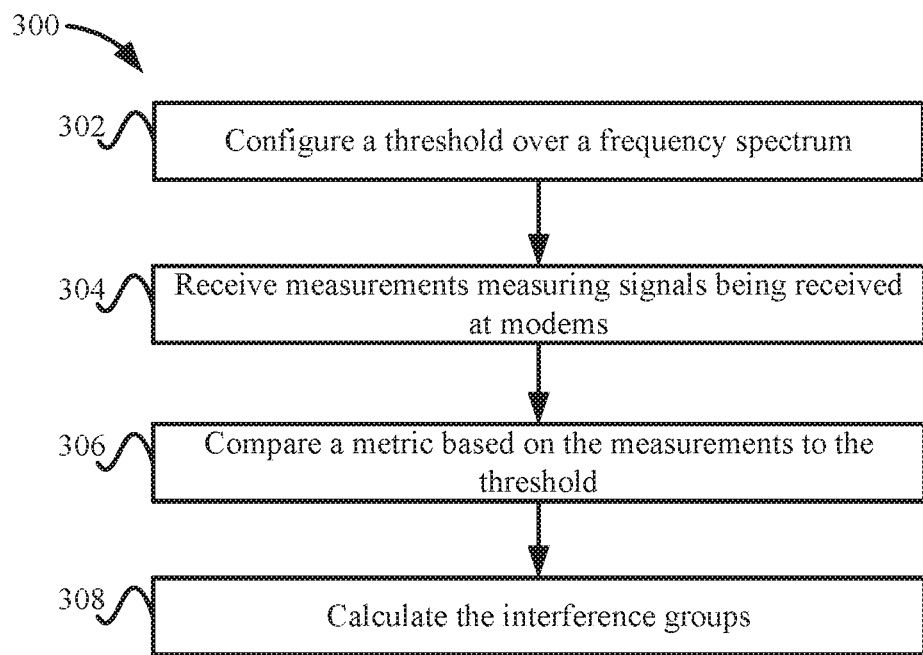
FIG. 3 depicts a simplified flowchart of a method for generating interference groups according to some embodiments.

FIG. 3 depicts a simplified flowchart 300 of a method for generating interference groups according to some embodiments. The following process may be a general process that interference group engine 104 performs to generate interference groups and more details will be described thereafter. At 302, interference group engine 104 configures a threshold over a frequency spectrum. For example, the threshold may cover a range of frequencies in frequency spectrum 200 that was described in FIG. 2 in which modems 112 send and receive signals. As will be discussed in more detail below, a fixed threshold and a variable threshold over the frequency spectrum may be used.

At 304, interference group engine 104 receives measurements that measure signals being received between modems 112. In some embodiments, as discussed above, a modem 112 may send a series of beacon signals and other modems 112 may take measurements during a time before the beacon signals are sent and then take measurements while the beacon signals are sent. The measurements may measure characteristics of the signal, such as signal-to-noise ratio or modulation error ratio, but other measurements may be used. The measurements may be determined by comparing the measurements before the signals are transmitted to measurements when the signals are sent. For example, the comparison may detect any interference that results when another modem sends a beacon signal. Once performing the measurements, modems 112 send the measurements to interference group engine 104. In other examples, network components in the network other than modems 112 may make the measurements. In some embodiments, the measurements may be based on continuous wave form (CW) tone or Orthogonal Frequency Division Multiplexing Access (OFDMA) upstream data profile methods. The tone or data profile methods use the tone or data profile signals to measure characteristics of the signals.

Once receiving the measurements, at 306, interference group engine 104 compares a metric based on the measurements to the threshold. In some embodiments, the metric may be the same as the measurement that was taken, such as the signal-to-noise ratio or modulation error ratio. In other examples, interference group engine 104 may calculate the metric from the measurements, such as a modulation error ratio degradation due to interference, an interference level, or some combination of the measurements and/or metrics can be used. The threshold is set based on the metric that will be used in the comparison. That is, if a modulation error ratio is being used as the metric, then the threshold may be a level of modulation error ratio.

At 308, interference group engine 104 calculates the interference groups. As will be described in more detail below, interference group engine 104 may calculate the interference groups across the frequency spectrum and/or based on different granularities in the frequency spectrum. The following will describe the process of generating the interference groups in more detail.

Threshold Selection

Figure 4:
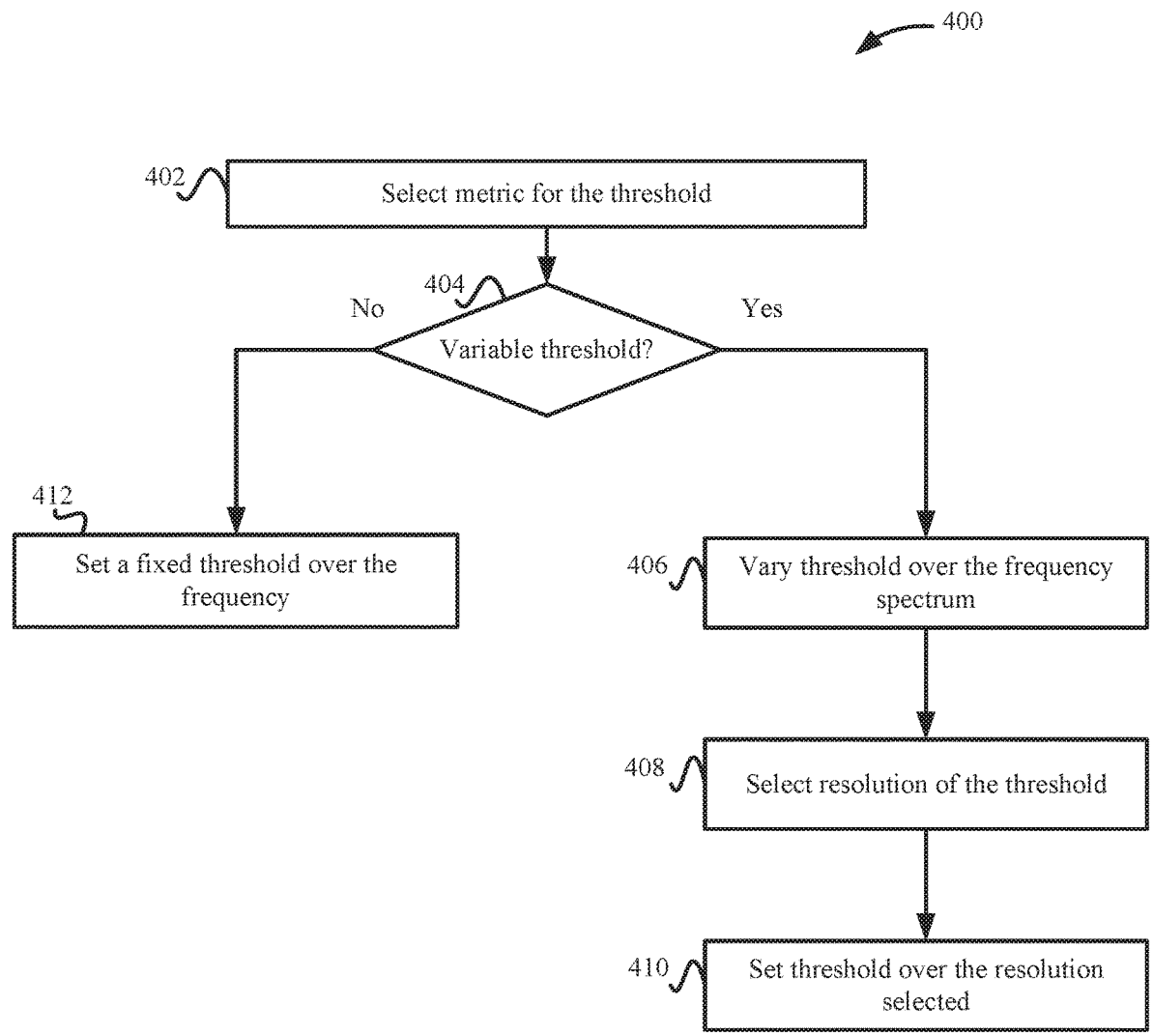
FIG. 4 depicts a simplified flowchart of a method for selecting the threshold according to some embodiments.

Before calculating the interference groups, interference group engine 104 sets the threshold. FIG. 4 depicts a simplified flowchart 400 of a method for selecting the threshold according to some embodiments. At 402, interference group engine 104 selects a metric for the threshold. The metric may be based on the measurements that are taken, such as modulation error ratio, modulation error ratio degradation, interference level, other metrics, or any combinations of the above metrics. In some embodiments, modems 112 take measurements at the sub-carrier level, such as the modulation error ratio may be measured at the sub-carrier level. That is, a first modem 112 sends a signal in a sub-carrier, and a second modem 112 receives a signal that is measured in the same sub-carrier. A direct metric comparison against the threshold may be performed at the sub-carrier level. However, when using metrics at the channel level or sub-band, the sub-carrier measurements may need to be processed to form metrics at the channel level or sub-band level. For example, an average of modulation error ratios or interference levels at sub-carrier frequencies in each channel may be used when comparing errors at the channel level.

Another metric may be the standard deviation/variation of modulation error ratios or interference levels at the sub-carrier frequencies in the channel. The standard deviation may be used with the average modulation error ratio to compare the metric that is configured per channel. Other metrics may also be used along with the average standard deviation.

At 404, interference group engine 104 determines if a variable threshold should be used. For example, a fixed threshold or a variable threshold may be used across the frequency spectrum. The fixed threshold does not change across the entire frequency spectrum being tested. However, the variable threshold changes values at different points across the frequency spectrum.

If a variable threshold is selected, interference group engine 104 varies the threshold over the frequency spectrum. Interference group engine 104 may vary the threshold based on different factors. For example, the threshold may be changed at different frequencies to account for different tolerance levels of interference at different frequencies. Also, the thresholds, both fixed and variable, may be dynamically changed, such as based on time, temperature, or other operating conditions.

At 408, interference group engine 104 selects the resolution of the threshold. The resolution of the threshold may be per channel, per sub-band, per sub-carrier, or some other combination. The resolution is selected because multiple comparisons across the frequency spectrum may be made based on the resolution.

At 410, interference group engine 104 sets the threshold over the resolution selected. For example, interference group engine 104 may set the threshold of values over the frequency spectrum based on the resolution. In some embodiments, for each sub-carrier, channel, etc., interference group engine 104 sets a value for different segments of the frequency spectrum based on the resolution.

If a fixed threshold is being used, at 412, interference group engine 104 sets a fixed threshold over the entire frequency spectrum. That is, the same threshold applies no matter what the resolution is or what frequency in the frequency spectrum is being compared.

Metric Processing

Figure 5:
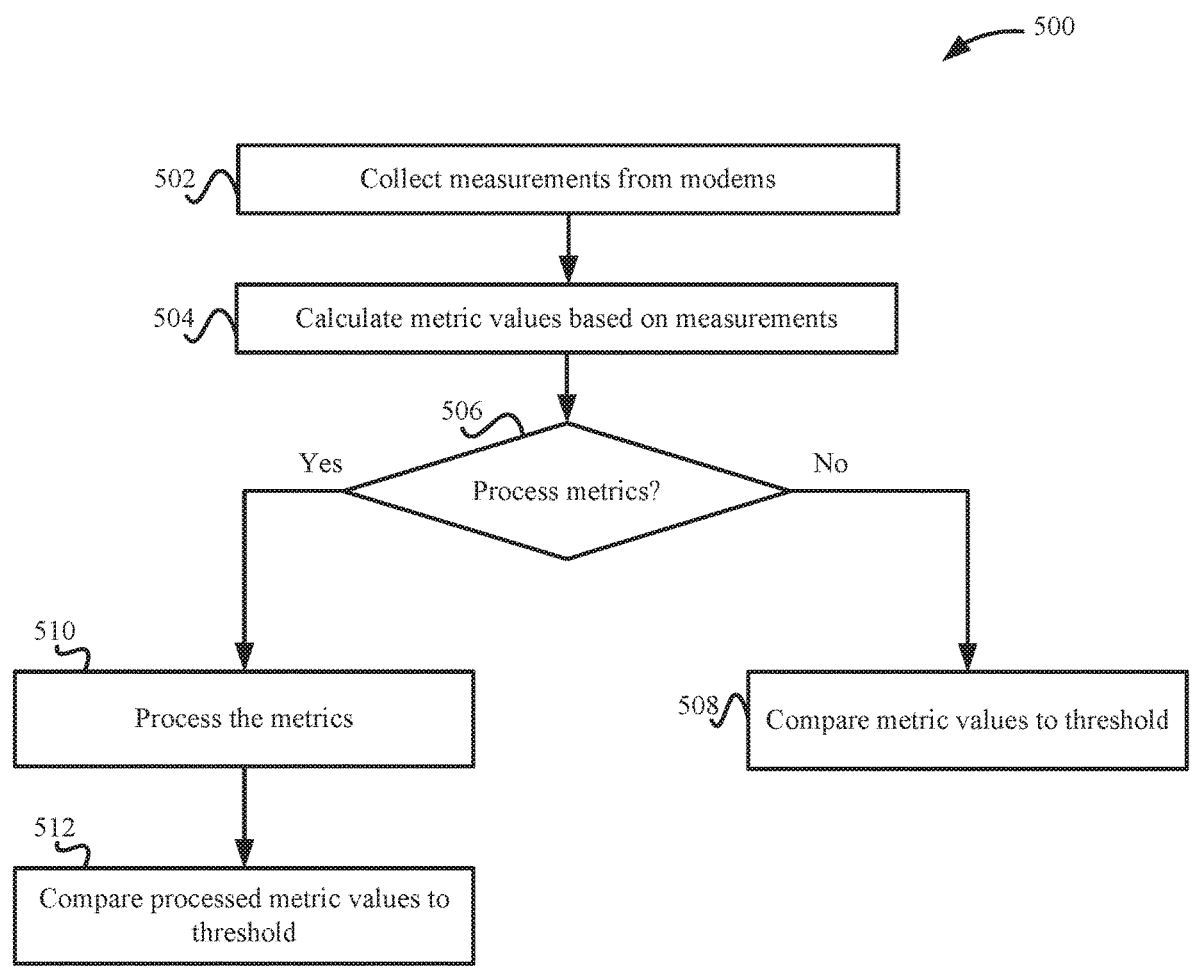
FIG. 5 depicts a simplified flowchart for generating metrics to compare to the threshold according to some embodiments.

As described above, different metrics may be used for the threshold. In some cases, the measurements taken may be different from the metrics used for the threshold. FIG. 5 depicts a simplified flowchart 500 for generating metrics to compare to the threshold according to some embodiments. At 502, interference group engine 104 collects measurements. The measurements may be taken at the sub-carrier level by modems 112, but other resolutions may be used.

At 504, interference group engine 104 calculates metric values based on the measurements. As discussed above, different metrics may be used and may be different from the measurements taken. For example, interference group engine 104 may convert modulation error ratio measurements to a standard deviation of modulation error ratio measurements.

At 506, interference group engine 104 determines whether to process the metrics. For example, if a direct comparison is being performed on the sub-carrier level, then the metric does not need to be processed. Accordingly, at 508, interference group engine 104 compares the metric values to the threshold. For example, interference group engine 104 may compare the modulation error ratio to the threshold on a per sub-carrier basis.

However, if the metric values need to be processed, at 510, interference group engine 104 processes the metric values. The processed metrics may be an average of modulation error ratios or interference levels at sub-carriers in the channel or the sub-band and may be compared to a metric that is configured per channel or per sub-band. A standard deviation or variance of the modulation error ratios at sub-carrier frequencies in the channel or the sub-band can be used with the average modulation error ratio to compare to the metric that is configured per channel or per sub-band. A sub-carrier based comparison may also be used. The comparison may determine a certain percentage of sub-carriers that pass the comparison. The results of the comparisons may be summarized and then interference group engine 104 determines whether or not the cable modems interfere on the channel or the sub-band level. Accordingly, the decisions at the sub-carrier level may need to be processed to determine interference groups at the channel or the sub-band level.

A threshold may be processed also. For example, if a threshold is at the sub-carrier level, then interference group engine 104 may calculate the threshold over a different resolution, such as at the channel, the sub-band, or another frequency range resolution. At 512, interference group engine 104 then compares the processed metric values to the threshold.

Figure 6:
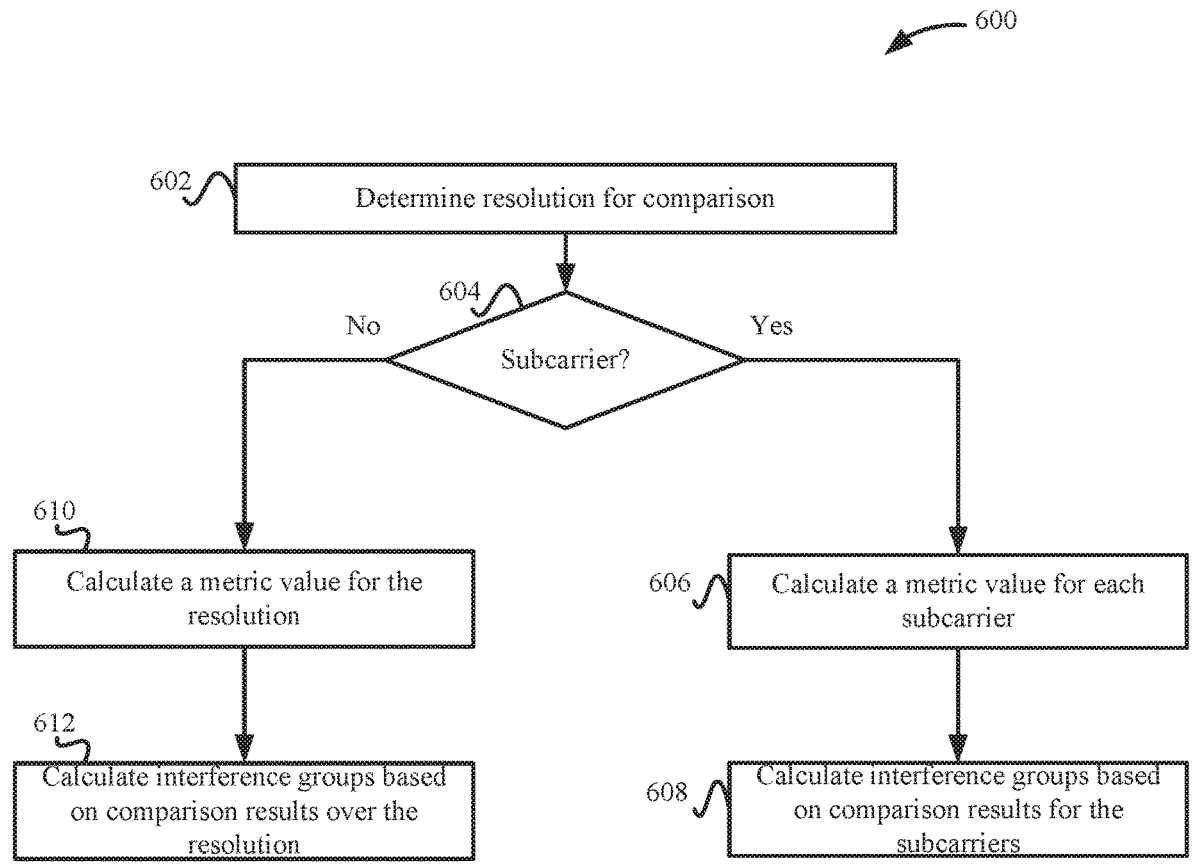
FIG. 6 depicts a simplified flowchart for a more detailed method of processing the measurements according to some embodiments.

FIG. 6 depicts a simplified flowchart 600 for a more detailed method of processing the measurements according to some embodiments. At 602, interference group engine 104 determines the resolution for the comparison. For example, the resolution may be per sub-carrier or another frequency range, such as per channel or per sub-band. At 604, interference group engine 104 determines if the resolution is at the sub-carrier resolution. The measurements may be taken at the sub-carrier resolution and thus may or may not need to be processed depending on the resolution for the upcoming comparison. If the resolution for the comparison is at the sub-carrier level, then at 606, interference group engine 104 calculates a metric value for each sub-carrier. For example, if the measurements were taken by cable modems 112 at the sub-carrier level, interference group engine 104 may determine the metric value for each sub-carrier from the measurements. At 608, interference group engine 104 calculates interference groups based on comparison results for the sub-carriers. For example, interference group engine 104 may compare a sub-carrier measurement with a sub-carrier threshold value for each sub-carrier.

If the resolution is not at the sub-carrier level, at 610, interference group engine 104 calculates a result for a resolution. The resolution may be for a spectrum frequency range greater than the sub-carrier, such as at the channel level, sub-band level, multiple sub-carrier groups, etc., or some variable frequency range. For example, one metric value may be based on a sub-carrier, another metric value may be based on a channel, etc. Also, a combination of using metric values at the sub-carrier level and another level (e.g., sub-band or channel) may be used. At 612, interference group engine 104 calculates the interference groups based on comparison results over the resolution. The interference groups may be determined in different ways. For example, interference group engine 104 processes the metrics and thresholds and one decision is made based on a comparison. Or, interference group engine 104 determines multiple decisions and interference group engine 104 processes the decisions to determine one decision.

Metric Comparison Examples

Figure 7:
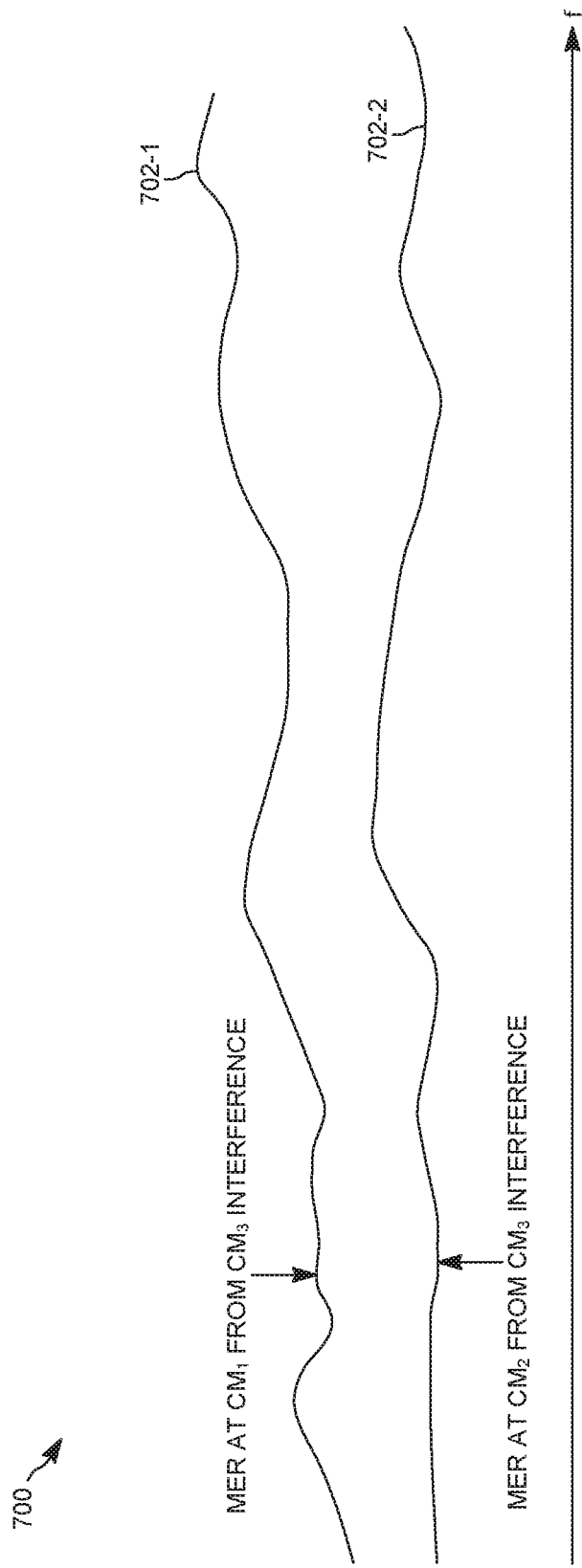
FIG. 7 shows an example of measurements across a frequency spectrum according to some embodiments.

FIG. 7 shows an example 700 of measurements across a frequency spectrum (f) according to some embodiments. At 702, the modulation error ratio (MER) at a cable modem $CM_1$ resulting from interference from a signal from cable modem $CM_3$. Also, at 702-2, the modulation error ratio at a cable modem $CM_2$ resulting from a signal from a cable modem $CM_3$ is shown. In this example, the modulation error ratio is used as the metric, but other metrics may be used. To measure the modulation error ratio, cable modem $CM_3$ may send a signal and cable modems $CM_1$ and $CM_2$ measure the interference as a result of the signal. In this case, cable modems $CM_1$ and $CM_2$ measure the modulation error ratio. As shown, over the frequency spectrum, the modulation error ratio may vary. In the case of using modulation error ratio, the higher the value means the less interference is measured and thus, less interference. Accordingly, the modem is experiencing less interference as the modulation error ratio values increase.

Figure 8:
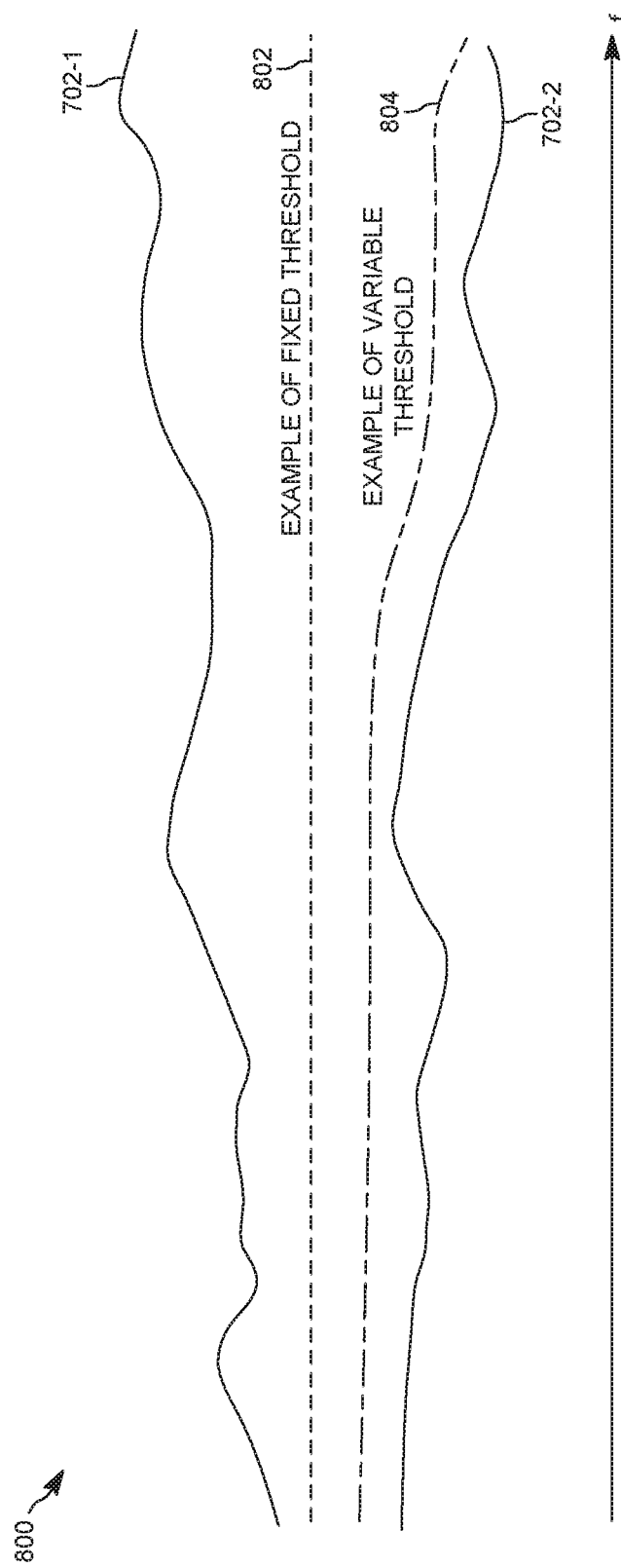
FIG. 8 shows an example of applying different thresholds to the metrics according to some embodiments.

FIG. 8 shows an example 800 of applying different thresholds to the metrics according to some embodiments. At 802, a fixed threshold is shown, and at 804, a variable threshold is shown. As shown, the fixed threshold is the same value across the entire frequency spectrum. However, the variable threshold changes values across the frequency spectrum.

In this example, the metric values at 702-1 for cable modem $CM_1$ from interference from cable modem $CM_3$ are above the fixed threshold. In this case, cable modem $CM_1$ and cable modem $CM_3$ experience low interference and may be in different interference groups. However, cable modem $CM_2$ and cable modem $CM_3$ may be in the same interference group because these modems experience a high level of interference. That is, the metric values found at 702-2 are below the fixed threshold and thus these modems may experience interference that is greater than desired. In this case, interference group engine 104 adds cable modem $CM_2$ and cable modem $CM_3$ to the same interference group such that these modems cannot transmit at the same time in the frequency spectrum.

Using the variable threshold, the same results occur. For example, at 702-1, the metric values measured at cable modem $CM_1$ are above the variable threshold. Also, at 702-2, the metric values measured at cable modem $CM_2$ are all below the variable threshold. Accordingly, the same interference groups are determined using the variable threshold.

Figure 9:
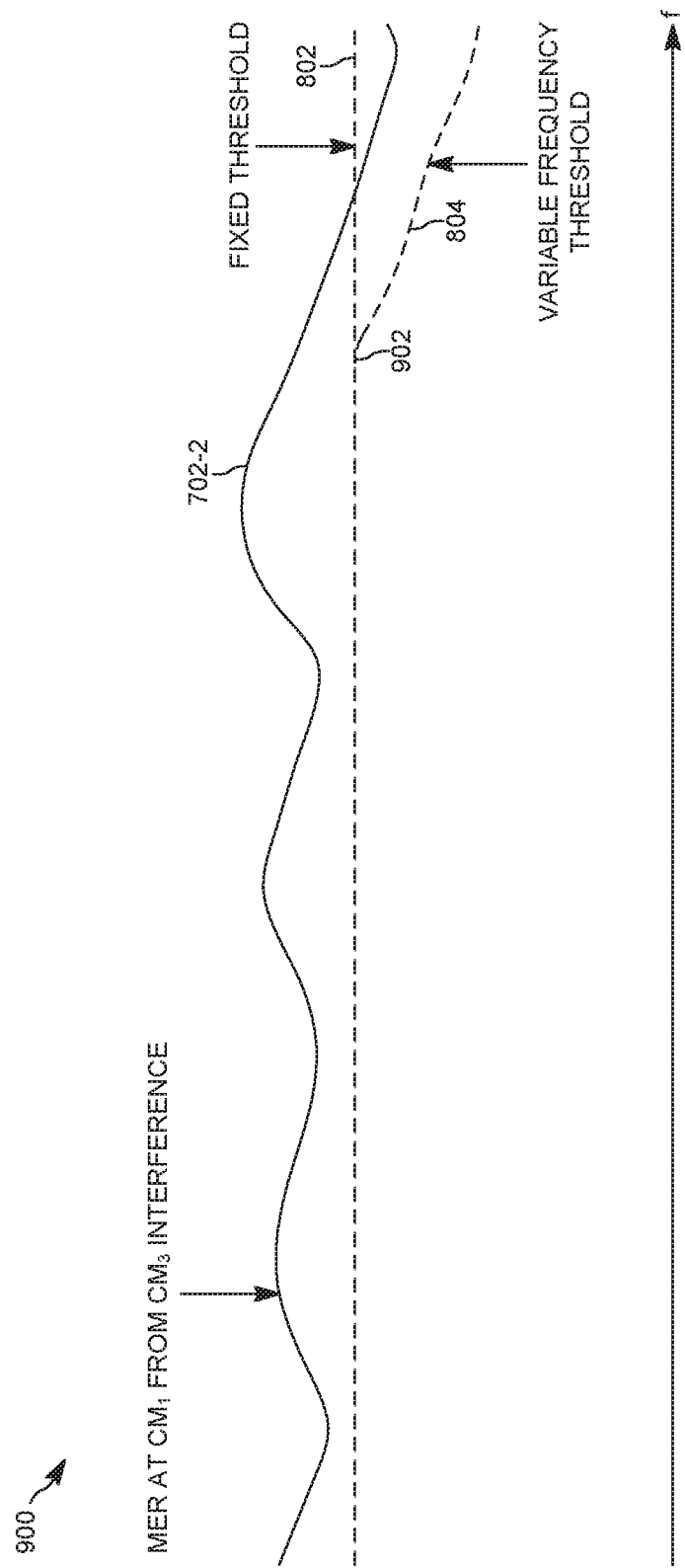
FIG. 9 depicts an example of how different interference groups are calculated using the different thresholds according to some embodiments.
Figure 10:
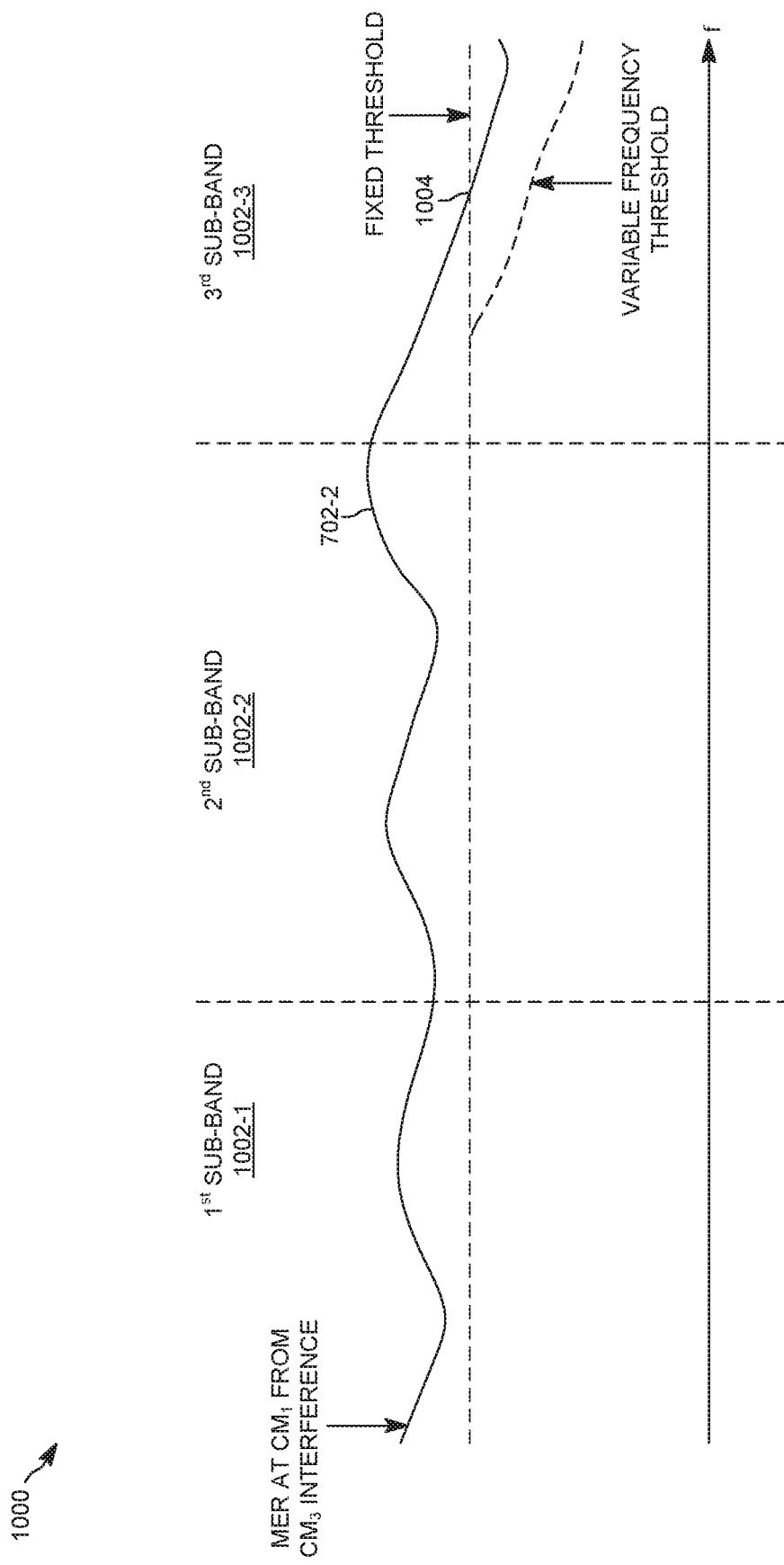
FIG. 10 depicts an example of a graph for determining interference groups using frequency ranges smaller than the frequency spectrum according to some embodiments.

In the above example, both types of thresholds resulted in the same interference groups. However, it is possible that different interference groups may be calculated based on the threshold used. FIG. 9 depicts an example 900 of how different interference groups are calculated using the different thresholds according to some embodiments. The metric values for cable modem $CM_1$ from interference by cable modem $CM_3$ are shown where the fixed threshold and variable threshold have the same value up to a point 902 in the frequency spectrum. After this point, the variable threshold decreases in value as the frequency increases, but the value of the fixed threshold stays the same. The metric values are always above the fixed threshold at frequencies before point 902, and then at the point 902, metric values go below the fixed threshold for frequencies after point 902. In some embodiments, because the metric values go below the fixed threshold, interference group engine 104 determines that cable modem $CM_1$ and cable modem $CM_3$ are in the same interference group. However, because the metric values are always above the variable threshold throughout the frequency spectrum and interference is low, interference group engine 104 determines that cable modem $CM_1$ and cable modem $CM_3$ are in different interference groups. The isolation of the ports of taps may variable across frequency. It is normally specified with a single high value. However, the actual performance may be below the specified value, but will be variable across frequency. In the above, interference group engine 104 determined the interference groups across the entire frequency spectrum based on a comparison. That is, the interference group decision is the same for all sub-bands, channels, and sub-carriers. However, interference group engine 104 may make interference group decisions based on frequency ranges that are smaller than the frequency spectrum, such as at the sub-band level, sub-carrier level, or other frequency ranges. FIG. 10 depicts an example of a graph 1000 for determining interference groups using frequency ranges smaller than the frequency spectrum according to some embodiments. The frequency spectrum has been broken up into three sub-bands 1002-1, 1002-2, and 1002-3. Each sub-band is associated with a different frequency range in the frequency spectrum. Interference group engine 104 may perform the comparisons per sub-band. For example, in first sub-band 1002-1, interference group engine 104 compares the metric values from 702-2 to the fixed threshold and the variable threshold. In first sub-band 1002-1, the metric values for cable modem $CM_1$ from interference from cable modem $CM_3$ are all above both the fixed threshold and the variable threshold.

For second sub-band 1002-2, interference group engine 104 compares the metric values at frequencies within second sub-band 1002-2 to the fixed threshold and the variable threshold. Similar to first sub-band 1002-1, the metric values are above both the fixed threshold and the variable threshold in second sub-band 1002-2.

In the third sub-band 1002-3, interference group engine 104 determines that the metric values are above the variable frequency threshold for all of the frequency values in third sub-band 1002-3. However, the metric values go below the fixed threshold at a point 1004 in third sub-band 1002-3 and continue below the fixed threshold for the frequencies after point 1004.

Interference group engine 104 may determine different interference groups based on different methodologies based on the above scenario. For example, interference group engine 104 may use a least common denominator across all sub-bands 1002. That is, if one sub-band fails the comparison, then all sub-bands are considered to have interference, and interference group engine 104 determines that the respective cable modems 112 are in the same interference group. Using this methodology, interference group engine 104 determines that cable modem $CM_1$ and cable modem $CM_3$ are in different interference groups if the variable threshold is used because the metric values are always above the variable threshold. However, interference group engine 104 determines that cable modem $CM_1$ and cable modem $CM_3$ are in the same interference group when using the fixed threshold because the metric values went below the fixed threshold in third sub-band 1002-3.

Interference group engine 104 may also use another methodology, such as applying a threshold per sub-band. Using this methodology, interference group engine 104 may determine that cable modem $CM_1$ and cable modem $CM_3$ are in different interference groups for first sub-band 1002-1 and second sub-band 1002-2 when using the fixed threshold, but in the same interference group for third sub-band 1002-3 when using the fixed threshold. Using the above interference group determination, cable modem $CM_1$ and cable modem $CM_3$ may communicate at the same time without restrictions when using first sub-band 1002-1 and second sub-band 1002-2. However, when using third sub-band 1002-3, cable modem $CM_1$ and cable modem $CM_3$ are restricted from communicating in different directions at the same time in the same frequency range. For example, when one cable modem is communicating using third channel 1000-3 in one direction, other cable modems in the same interference group are restricted from communicating using third channel 1002-3 in the other direction in the same frequency range. cable modem $CM_1$ and cable modem $CM_3$ may communicate at the same time if transmitting together without receiving any signals in the same frequency range or receiving together without transmitting in the same frequency range. Using the per sub-band comparison may create an optimal interference group configuration that provides more flexibility in traffic scheduling because only specific sub-band that may have interference include restrictions on traffic scheduling.

In other examples, a combination of the least common denominator and the per sub-band may be used. A subset of the sub-band may use the least common denominator method while other sub-band may use the per sub-band method. Other resolutions may also be used, such as the decision may be made on a channel, a sub-carrier, or another frequency range.

Conclusion

Accordingly, by using a threshold across a frequency spectrum, interference group engine 104 can determine the interference groups in different ways. The determination of the interference group may minimize the interference experienced by cable modems while limiting the restrictions on traffic scheduling. For example, the calculation on which cable modems are in the interference groups may be determined on different granularities of the frequency spectrum, such as on the sub-band, channel, or sub-carrier granularities.

Embodiments

In some embodiments, a method includes: setting, by a computing device, a threshold over a frequency spectrum; receiving, by the computing device, a set of measurements that measures interference between a set of network devices over the frequency spectrum; comparing, by the computing device, a set of metric values based on the set of measurements to the threshold at a plurality of points over the frequency spectrum; and selecting, by the computing device, whether the set of network devices are in a group that interfere with communications of each other based on the comparing.

In some embodiments, the threshold includes a fixed threshold across the frequency spectrum, and comparing the metric includes: comparing the set of metric values to the fixed threshold at the plurality of points.

In some embodiments, the threshold comprises a variable threshold across the frequency spectrum, and comparing the metric includes: comparing the set of metric values to the variable threshold at the plurality of points.

In some embodiments, receiving the set of measurements includes: receiving the set of measurements from one or more signals received from one or more network devices while another network device transmits a signal.

In some embodiments, the set of measurements are used to measure interference in the one or more signals received by the one or more network devices from the signal transmitted by the another network device.

In some embodiments, the method includes processing the set of measurements are received at a first granularity and the set of metric values are calculated at a second granularity.

In some embodiments, the first granularity is a sub-carrier level, and the second granularity is a level that includes a plurality of sub-carriers.

In some embodiments, a value at the second granularity in the set of metric values is calculated using a plurality of measurements at the first granularity.

In some embodiments, selecting whether the set of network devices are in the group that interfere with communications of each other includes: calculating a first set of results at a first granularity; calculating a second set of results at a second granularity using the first set of results at the first granularity; and using the second set of results at the second granularity to determine whether the set of network devices are in the group that interfere with communications of each other.

In some embodiments, the first granularity is a sub-carrier level, the second granularity is a channel level or sub-band level, wherein the channel level or sub-band level include a plurality of sub-carriers, and the second set of results are compared to the threshold.

In some embodiments, selecting whether the set of network devices are in the group that interfere with communications of each other includes: processing the set of metric values at a first granularity to generate a set of metric values at a second granularity; and using the set of metric values at the second granularity to determine whether the set of network devices are in the group that interfere with communications of each other.

In some embodiments, selecting whether the set of network devices are in the group that interfere with communications of each other includes: wherein the group is included in a plurality of groups associated with a plurality of frequency ranges, wherein the set of network devices are placed in the plurality of groups per frequency range in the plurality of frequency ranges.

In some embodiments, the plurality of frequency ranges are one or more of a plurality of channels or a plurality of sub-bands in which the set of network devices communicate.

In some embodiments, the plurality of frequency ranges are one or more frequency ranges in which the set of network devices communicate.

In some embodiments, a non-transitory computer-readable storage medium containing instructions that, when executed, control a computer system to be operable for: setting a threshold over a frequency spectrum; receiving a set of measurements that measures interference between a set of network devices over the frequency spectrum; comparing a set of metric values based on the set of measurements to the threshold at a plurality of points over the frequency spectrum; and selecting whether the set of network devices are in a group that interfere with communications of each other based on the comparing.

In some embodiments, the threshold comprises a fixed threshold across the frequency spectrum, and comparing the metric includes: comparing the set of metric values to the fixed threshold at the plurality of points.

In some embodiments, the threshold comprises a variable threshold across the frequency spectrum, and comparing the metric includes: comparing the set of metric values to the variable threshold at the plurality of points.

In some embodiments, processing the set of measurements are received at a first granularity and the set of metric values are calculated at a second granularity In some embodiments, selecting whether the set of network devices are in the group that interfere with communications of each other includes: wherein the group is included in a plurality of groups associated with a plurality of frequency ranges, wherein the set of network devices are placed in the plurality of groups per frequency range in the plurality of frequency ranges.

In some embodiments, an apparatus includes: one or more computer processors; and a non-transitory computer-readable storage medium comprising instructions, that when executed, control the one or more computer processors to be operable for: setting a threshold over a frequency spectrum; receiving a set of measurements that measures interference between a set of network devices over the frequency spectrum; comparing a set of metric values based on the set of measurements to the threshold at a plurality of points over the frequency spectrum; and selecting whether the set of network devices are in a group that interfere with communications of each other based on the comparing.

System

Figure 11:
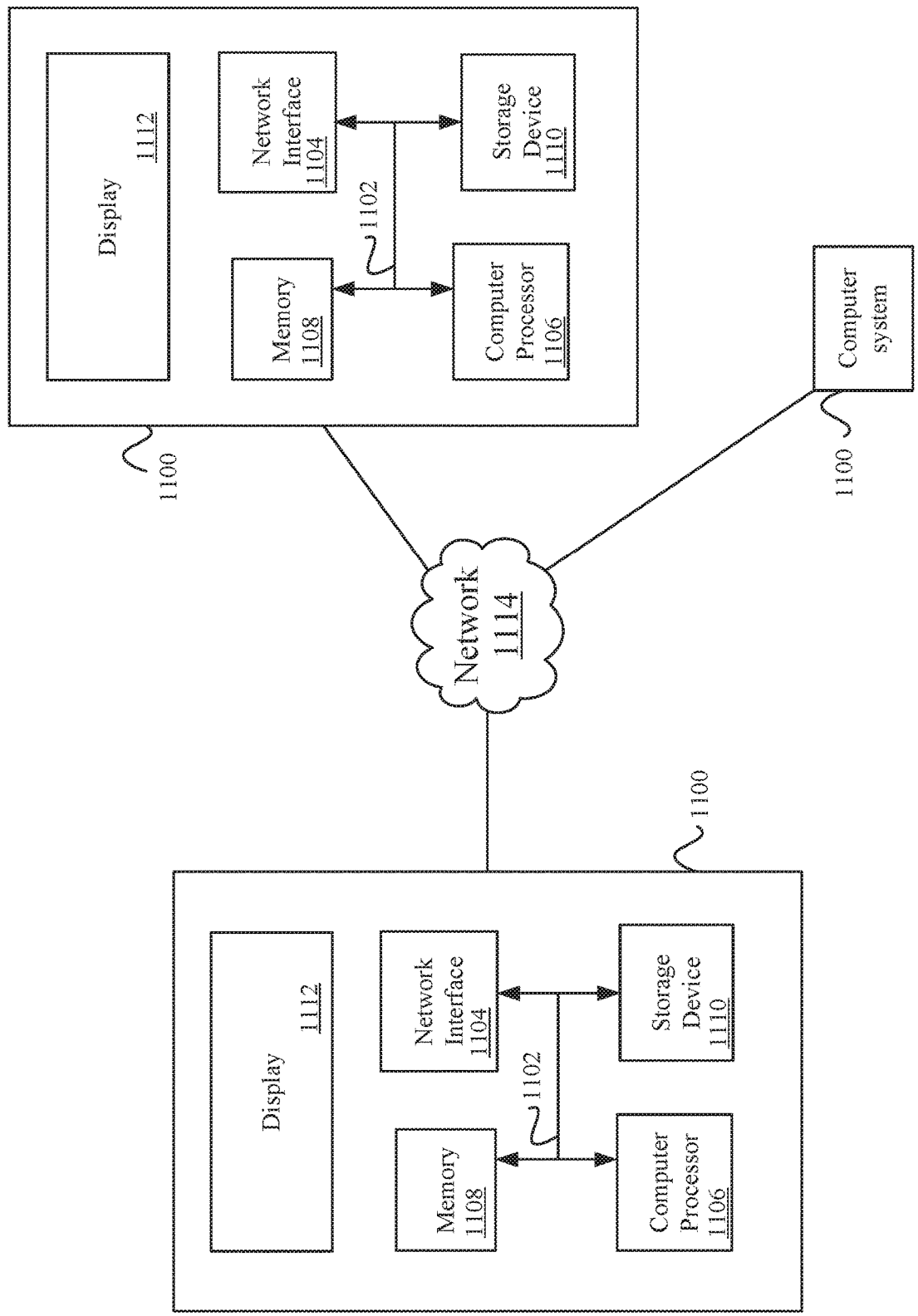
FIG. 11 illustrates an example of special purpose computer systems according to some embodiments.

FIG. 11 illustrates an example of special purpose computer systems 1100 according to some embodiments. Computer system 1100 includes a bus 1102, network interface 1104, a computer processor 1106, a memory 1108, a storage device 1110, and a display 1112.

Bus 1102 may be a communication mechanism for communicating information. Computer processor 1106 may execute computer programs stored in memory 1108 or storage device 1110. Any suitable programming language can be used to implement the routines of some embodiments including C, C++, Java, assembly language, etc. Different programming techniques can be employed such as procedural or object oriented. The routines can execute on a single computer system 1100 or multiple computer systems 1100. Further, multiple computer processors 1106 may be used.

Memory 1108 may store instructions, such as source code or binary code, for performing the techniques described above. Memory 1108 may also be used for storing variables or other intermediate information during execution of instructions to be executed by processor 1106. Examples of memory 1108 include random access memory (RAM), read only memory (ROM), or both.

Storage device 1110 may also store instructions, such as source code or binary code, for performing the techniques described above. Storage device 1110 may additionally store data used and manipulated by computer processor 1106. For example, storage device 1110 may be a database that is accessed by computer system 1100. Other examples of storage device 1110 include random access memory (RAM), read only memory (ROM), a hard drive, a magnetic disk, an optical disk, a CD-ROM, a DVD, a flash memory, a USB memory card, or any other medium from which a computer can read.

Memory 1108 or storage device 1110 may be an example of a non-transitory computer-readable storage medium for use by or in connection with computer system 1100. The non-transitory computer-readable storage medium contains instructions for controlling a computer system 1100 to be configured to perform functions described by some embodiments. The instructions, when executed by one or more computer processors 1106, may be configured to perform that which is described in some embodiments.

Computer system 1100 includes a display 1112 for displaying information to a computer user. Display 1112 may display a user interface used by a user to interact with computer system 1100.

Computer system 1100 also includes a network interface 1104 to provide data communication connection over a network, such as a local area network (LAN) or wide area network (WAN). Wireless networks may also be used. In any such implementation, network interface 1104 sends and receives electrical, electromagnetic, or optical signals that carry digital data streams representing various types of information.

Computer system 1100 can send and receive information through network interface 1104 across a network 1114, which may be an Intranet or the Internet. Computer system 1100 may interact with other computer systems 1100 through network 1114. In some examples, client-server communications occur through network 1114. Also, implementations of some embodiments may be distributed across computer systems 1100 through network 1114.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a set of measurements that measures interference between a set of network devices over a frequency spectrum;
selecting, by the computing device, a threshold characteristic and a threshold value, the threshold characteristic comprising a respective one of a fixed threshold or a variable threshold;
based on the selected threshold characteristic, determining a granularity for subdividing the frequency spectrum into one or more partitions;
selectively processing the set of measurements into a set of metrics each having a metric characteristic and a metric value, the metric characteristic based on the granularity of the one or more partitions, and where each network device has an associated one of the set of metrics for each one or more partition; and
comparing, by the computing device, the metric value associated with each network device to the threshold value at each of the one or more partitions; and sorting the network devices into a plurality of interference groups, each interference groups associated with one of the said one or more partitions.

2. The method of claim 1, wherein receiving the set of measurements comprises receiving the set of measurements from one or more signals received from one or more network devices while another network device transmits a signal.

3. The method of claim 2, wherein the set of measurements are used to measure interference in the one or more signals received by the one or more network devices from the signal transmitted by the another network device.

4. The method of claim 1, where the set of measurements are received at a first said granularity and the set of metric values are calculated at a second said granularity.

5. The method of claim 4, wherein the first granularity is a sub-carrier level, and the second granularity is a level that includes a plurality of sub-carriers.

6. The method of claim 4, wherein a value at the second granularity in the set of metric values is calculated using a plurality of measurements at the first granularity.

7. The method of claim 1 including:
calculating a first set of metrics at a first said granularity;
calculating a second set of metrics at a second said granularity using the first set of metrics at the first granularity; and
using the second set of metrics at the second granularity to sort the network devices.

8. The method of claim 7, wherein the first granularity is a sub-carrier level, the second granularity is a channel level or sub-band level, wherein the channel level or sub-band level include a plurality of sub-carriers, and the second set of results are compared to the threshold.

9. The method of claim 1 including:
processing the set of metric values at a first said granularity to generate a set of metric values at a second said granularity; and
using the set of metric values at the second granularity to sort the set of network devices.

10. A non-transitory computer-readable storage medium containing instructions that, when executed, control a computer system to be operable for:
receiving a set of measurements that measures interference between a set of network devices over a frequency spectrum;
selecting a threshold characteristic and a threshold value, the threshold characteristic comprising a respective one of a fixed threshold or a variable threshold;
based on the selected threshold characteristic, determining a granularity for subdividing the frequency spectrum into one or more partitions;
selectively processing the set of measurements into a set of metrics each having a metric characteristic and a metric value, the metric characteristic based on the granularity of the one or more partitions, and where each network device has an associated one of the set of metrics for each one or more partition; and
comparing the metric value associated with each network device to the threshold value at each of the one or more partitions; and sorting the network devices into a plurality of interference groups, each interference groups associated with one of the said one or more partitions.

11. An apparatus comprising:
one or more computer processors; and
a non-transitory computer-readable storage medium comprising instructions, that when executed, control the one or more computer processors to be operable for:
receiving a set of measurements that measures interference between a set of network devices over a frequency spectrum;
selecting a threshold characteristic and a threshold value, the threshold characteristic comprising a respective one of a fixed threshold or a variable threshold;
based on the selected threshold characteristic, determining a granularity for subdividing the frequency spectrum into one or more partitions;
selectively processing the set of measurements into a set of metrics each having a metric characteristic and a metric value, the metric characteristic based on the granularity of the one or more partitions, and where each network device has an associated one of the set of metrics for each one or more partition; and
comparing the metric value associated with each network device to the threshold value at each of the one or more partitions; and sorting the network devices into a plurality of interference groups, each interference groups associated with one of the said one or more partitions.

12. The apparatus of claim 11, wherein receiving the set of measurements comprises receiving the set of measurements from one or more signals received from one or more network devices while another network device transmits a signal.

13. The apparatus of claim 12, wherein the set of measurements are used to measure interference in the one or more signals received by the one or more network devices from the signal transmitted by the another network device.

14. The apparatus of claim 12, where the set of measurements are received at a first said granularity and the set of metric values are calculated at a second said granularity.

15. The apparatus of claim 14, wherein the first granularity is a sub-carrier level, and the second granularity is a level that includes a plurality of sub-carriers.

16. The apparatus of claim 14, wherein a value at the second granularity in the set of metric values is calculated using a plurality of measurements at the first granularity.

17. The apparatus of claim 11 including:
calculating a first set of metrics at a first said granularity;
calculating a second set of metrics at a second said granularity using the first set of metrics at the first granularity; and
using the second set of metrics at the second granularity to sort the network devices.

18. The method of claim 17 wherein the first granularity is a sub-carrier level, the second granularity is a channel level or sub-band level, wherein the channel level or sub-band level include a plurality of sub-carriers, and the second set of results are compared to the threshold.

19. The method of claim 11 including:
processing the set of metric values at a first said granularity to generate a set of metric values at a second said granularity; and
using the set of metric values at the second granularity to sort the set of network devices.

* * * * *